(No Model.) 2 Sheets—Sheet 1.

S. LEE.
Apparatus for Recovering Soda from Waste Alkaline Liquor.

No. 237,113. Patented Feb. 1, 1881.

Attest:
Wm. H. Cason
Henry V. Buckley

Inventor
Samuel Lee per
George E. Buckley
Atty.

(No Model.)  
2 Sheets—Sheet 2.

S. LEE.
Apparatus for Recovering Soda from Waste Alkaline Liquor.

No. 237,113.  Patented Feb. 1, 1881.

Attests  
Wm. R. Carson.  
Henry V. Buckley

Inventor  
Samuel Lee  
per George E. Buckley  
atty.

UNITED STATES PATENT OFFICE.

SAMUEL LEE, OF WEST MANAYUNK, PENNSYLVANIA.

APPARATUS FOR RECOVERING SODA FROM WASTE ALKALINE LIQUOR.

SPECIFICATION forming part of Letters Patent No. 237,113, dated February 1, 1881.

Application filed June 8, 1880. (No model.)

*To all whom it may concern:*

Be it known that I, SAMUEL LEE, of West Manayunk, Montgomery county, Pennsylvania, have invented certain new and useful improvements in apparatus for the evaporation and incineration of the waste liquor resulting from the reduction of vegetable fiber to paper-pulp; and I hereby declare the following to be a full, clear, and exact description of the same, reference being had to the annexed drawings, making part hereof.

The nature of my invention will be fully shown by the following description and claims. It relates to that class of apparatus in which the waste liquor resulting from the reduction of vegetable fiber to paper-pulp is first evaporated, and the resultant mass is then incinerated to recover the soda, which would otherwise be wasted. Its object is to save, as much as possible, the shell of the incinerating-oven from rapid destruction, and to utilize the waste heat of this oven at the same time.

Figure 1:
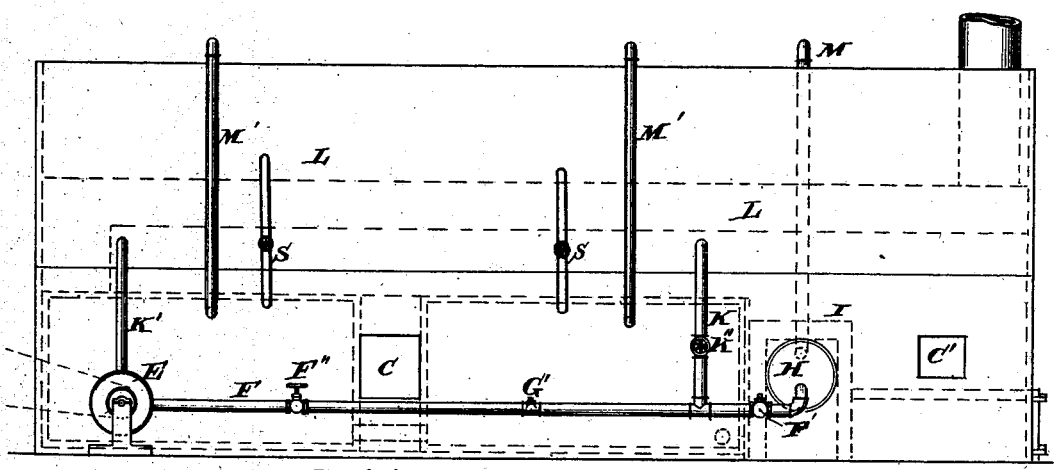
Figure 2:
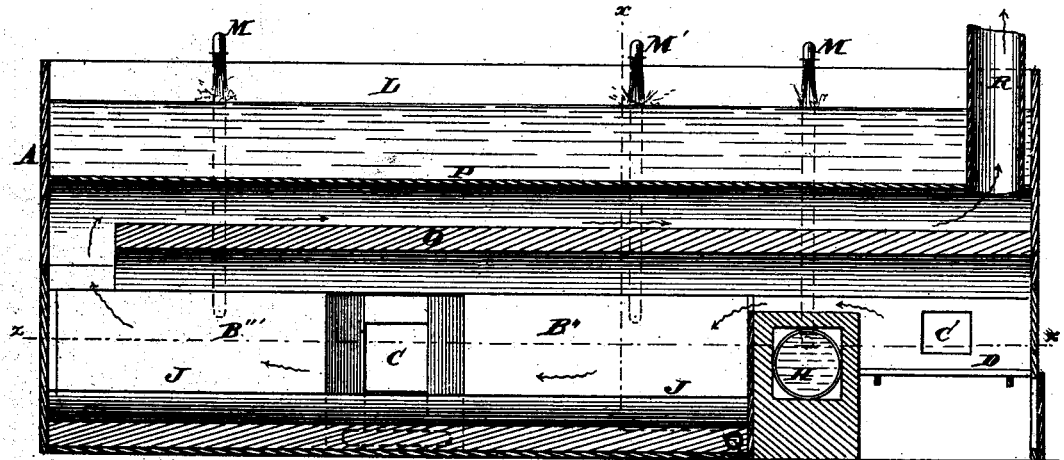
Figure 3:
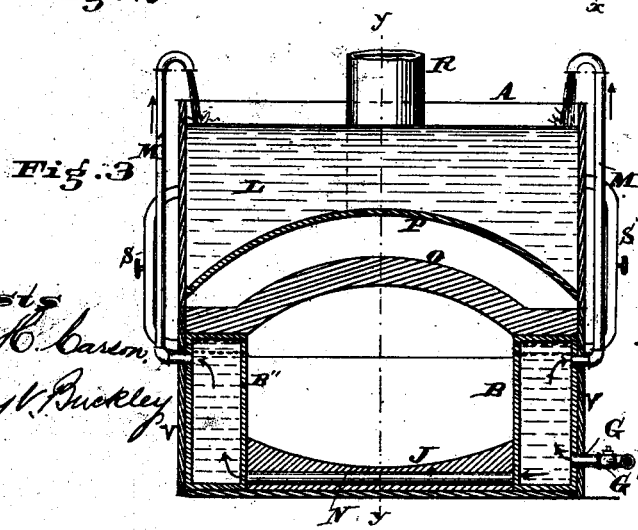
Figure 4:
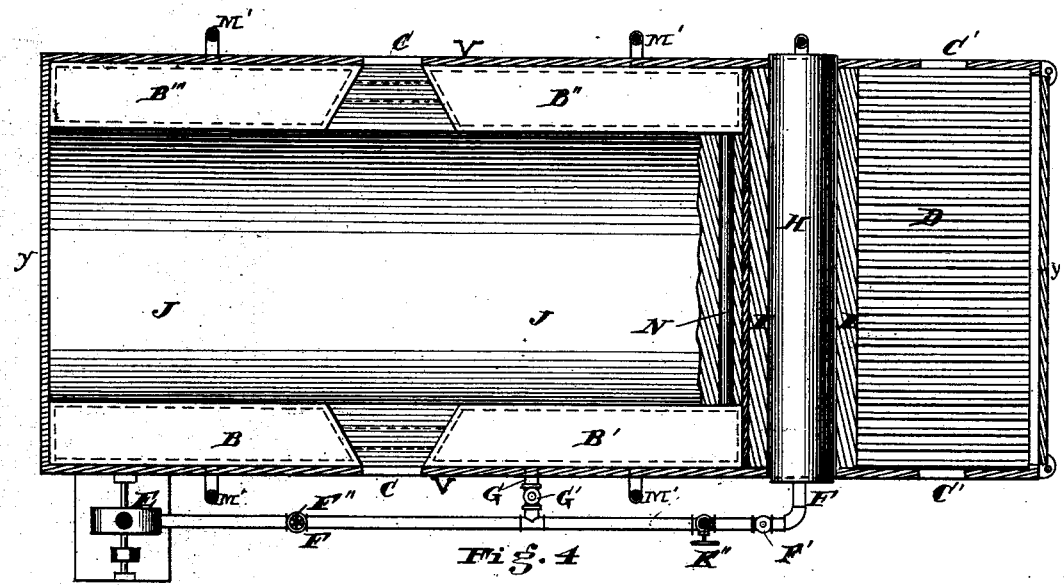
Figure 5:
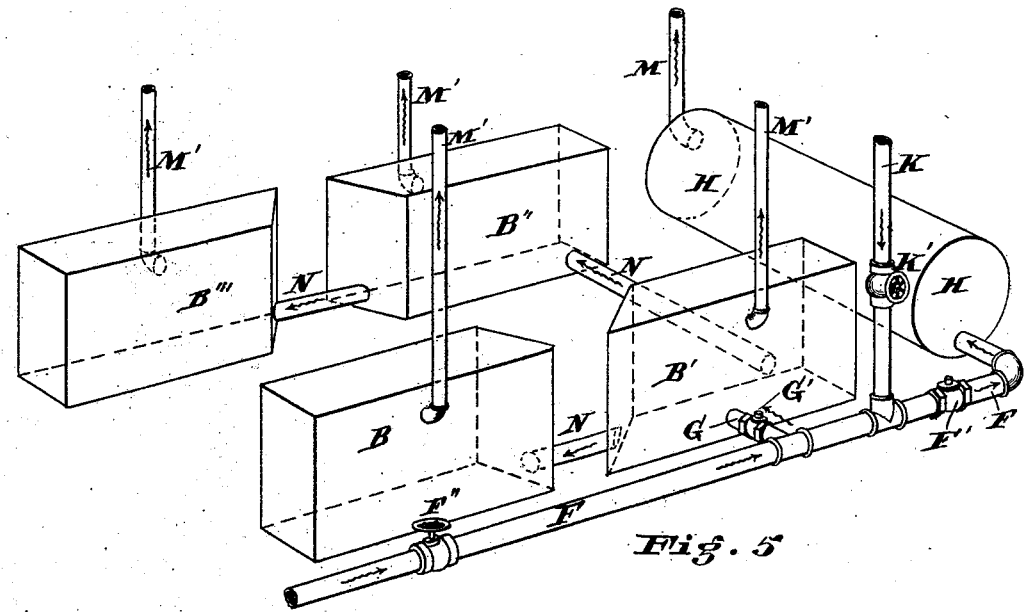

In the drawings, Figure 1 is a side elevation of my apparatus, showing the interior in dotted lines; Fig. 2, a vertical longitudinal sectional view of the same on line $y\,y$ of Fig. 3; Fig. 3, a vertical cross sectional view of the same on the line $x\,x$ of Fig. 2; Fig. 4, a horizontal sectional view of the same on the line $z\,z$ of Fig. 2; Fig. 5, a detached perspective view of the jambs or boxes and the bridge-cylinder and pipes, all arranged in their relative positions one to another.

A is the outer shell or soling-pan. V is the outer case of the incinerating-oven. B B' B'' B''' are the jambs or boxes, made of cast-iron, and set against the inside of the case V. This case or shell and the boxes or jambs above referred to form a hollow casing or shell around the incinerating hearth or oven. C are doors to permit the working of the charge; C', the doors for stirring the fires in the furnace D. E is a fan-pump; F, a hollow pipe for circulating the liquor; G, a short pipe connecting pipe F with the interior of box B'; G', a check-valve; H, a drum, of boiler-iron, set in the brick-work of the bridge I, over which the heat and flame of the furnace D pass to the brick incinerating-hearth J; F', a check-valve; F'', a cock. K is a pipe connecting the interior of the evaporating-pan L with the pipe F. K' connects the interior of the evaporating-pan with pump E. M is a pipe, curved over at the top to throw liquor from the drum H up into the evaporating-pan L. M' M' M' M' are similar pipes from the boxes B B' B'' B''', to throw liquor into said pan L. N N N are pipes to connect the successive boxes one with another. O is the arched brick roof of the incinerating-oven. P is the correspondingly-arched iron bottom of the evaporating-pan L, leaving an open space between it and the roof O, to permit the passage under the pan L of the heat from the furnace and burning mass on the hearth below. R is the stack.

A blower may be used in the furnace, if desired, to increase and hasten combustion.

Pipes S S are inserted through the sides of the evaporating-pan, at points a little above the level of the highest point of the curved bottom thereof, and at their lower extremities pass through the sides of the incinerating-oven. These pipes are provided with cocks, whereby the mass of partially-evaporated waste liquor can be transferred to the hearth below in any desired quantity. The upper ends of these pipes are placed at this high point in the side of the pan, so as never to drain so much liquor out as to leave the bottom of the pan exposed to be burned out by the heat passing below it. The pipes N, for a similar reason, are laid beneath the upper surface of the hearth or floor of the oven.

The operation is as follows: The evaporating-pan L is filled with the waste liquor from the digester, and after closing cock K'' the pump E is started. The liquor is then drawn from pan L down through pipe K', passes through the pump E, is driven through pipe F to the point where short pipe G joins pipe F. Here it divides, some of it passing through pipe G and valve G' into box B'. The rest of the liquor in transit continues through pipe F and valve F' into drum H, which becomes filled with the liquor; thence it passes out through pipe M, whence it is sprayed or shot into the evaporating-pan again. That portion which passed into box G' gradually fills said box at the same time that it is filling boxes B B'' and B''' by means of the connecting conduits or pipes N N N. When these boxes are filled the liquor forces its way (propelled by the pump) up through pipes M' M' M' M', and is thence sprayed or shot back again into the pan L, from which it originally started. The hollow iron boxes B B' B'' B''' and drum H are thus protected from being burned out by the heat of the hearth, and the liquor within them is rapidly heated by the caloric transmitted through the shells of the vessels containing it. The drum H' is dressed in a coating of brick-work, and serves to receive from the bricks the intense heat given to them by the furnace-fire, and to transmit it to the liquor, by which it is carried off in course of circulation. The liquor thus shields all these parts from rapid destruction, at the same time that it is receiving the necessary heat to evaporate it, when, in its circuit, it is once more exposed in the open pan L.

I purpose finally extending the system above described to the hearth itself, making it of iron, and circulating the liquor below it and in immediate contact with it.

After the mass has been sufficiently evaporated it is thrown down upon the hearth J through conduits S S, and another charge from the digester is placed in the pan L. The incineration of the mass upon hearth J now begins. The intense heat and flame of the furnace passes over it in the course of the draft from the stack R, as indicated by the arrows. (See Fig. 2.) The heat passes over the hearth, and then up and under the bottom of the pan L, to the stack or chimney R. After the flame has acted for some hours upon the mass on the hearth the mass gets so dry that it ignites, and soon attains a heat even more intense than that of the furnace-fire. This soon burns out all the combustible matter, and the charge is then removed, and is afterward lixiviated, to separate the soda for reuse in the pulp-digester.

So long as the pump is kept in operation the process is as above described; but if, after the charge is lighted on the hearth, it is desired to cease mechanical action, it will be found that the apparatus will automatically sustain the circulation of the liquor in the pan L. In this case the pump is stopped, and the cock K' is opened and cock F'' is closed. The boxes B B' B'' B''' are, of course, perfectly full of waste liquor. The space within them is all occupied, and the coolest part of the liquor— that from which they are supplied—is above their highest level, being in the evaporating-pan L. The action of the intense heat of the charge on the hearth now is to create a strong steam-pressure in these boxes, which has its only vent up through the pipes M' M' M' M'. The steam, in thus passing up these pipes, forces the liquor standing in them up above the level of that in the pan, which would be its natural level, and drives it out of these pipes with even more force than is exerted by the pump. This action is continuous, and, being automatic, saves much labor, and almost dispenses with the necessity of the pump. The cooler liquor from the pan L comes down through pipe K, forced by the weight of the charge in pan L, and is admitted to box B' by the check-valve G', which is adapted to open to pressure from pipe F, while it closes to and resists pressure from the box B'. The only exit of the liquor is, therefore, the pipe M'. This automatic action extends also to the drum H, which sends its liquor up through pipe M in like manner.

One of the great objects of my invention is to overcome the difficulties heretofore resulting from the intense heat of these furnaces, which rapidly destroyed all the brick lining. This destruction is so rapid that about every three months all operations have to cease, and these costly furnaces have to be torn out and almost entirely rebuilt.

The boxes B B', &c., and case V really form the walls of the incinerating-chamber.

Having thus described my invention, what I claim as new, and desire to secure by Letters Patent, is—

1. In an apparatus for recovering soda from the waste alkaline liquor used in reducing vegetable fiber to paper-pulp, a hollow shell surrounding the incinerating-hearth, the interior space of which shell is connected by pipes or conduits with the waste-liquor reservoir or evaporating-pan, whereby the said shell by continuous circulation can be kept filled with alkaline liquor to absorb the heat generated in the incinerating-chamber, substantially as described.

2. In an apparatus for recovering soda from the waste alkaline liquor used in reducing vegetable fiber to paper-pulp, the combination of the incinerating-hearth J, hollow walls, boxes, or drums B, B', B'', B''', and H, evaporating-pan L, pump E, and pipes F G K K', furnished with suitable valves F' G', and cocks F'' K'', and pipes M M', whereby a continuous mechanical circulation of the charge being treated in the pan L can be sustained through the walls or hollow boxes and the pan L to heat the liquor in circulation and carry off the heat of the incinerating-chamber as it is transmitted through the walls thereof, substantially as described.

SAMUEL LEE.

Witnesses:
HENRY V. BUCKLEY,
GEORGE E. BUCKLEY.